(12) United States Patent
Kim et al.

(10) Patent No.: US 9,111,272 B2
(45) Date of Patent: Aug. 18, 2015

(54) MOBILE PAYMENTS

(75) Inventors: Jae-Hyung Kim, Seoul (KR);
Jong-Cheol Hong, Seoul (KR);
Ho-Jong Jung, Incheon (KR);
Jong-Min Yoon, Incheon (KR)

(73) Assignee: BIZMODELINE CO., LTD., Seoul (KR)

( * ) Notice: Subject to any disclaimer, the term of this patent is extended or adjusted under 35 U.S.C. 154(b) by 893 days.

(21) Appl. No.: 12/731,323

(22) Filed: Mar. 25, 2010

(65) Prior Publication Data
US 2011/0238569 A1 Sep. 29, 2011

(51) Int. Cl.
*G06Q 40/00* (2012.01)
*G06Q 20/32* (2012.01)
*G06Q 20/10* (2012.01)
*G06Q 20/40* (2012.01)
*G06Q 20/42* (2012.01)

(52) U.S. Cl.
CPC ............ *G06Q 20/322* (2013.01); *G06Q 20/102* (2013.01); *G06Q 20/325* (2013.01); *G06Q 20/405* (2013.01); *G06Q 20/42* (2013.01); *G06Q 40/00* (2013.01); *G06F 2221/2101* (2013.01); *G06F 2221/2115* (2013.01); *G06F 2221/2135* (2013.01)

(58) Field of Classification Search
USPC .............................................................. 705/4
See application file for complete search history.

(56) References Cited

U.S. PATENT DOCUMENTS

| | | | |
|---|---|---|---|
| 7,870,027 B1 * | 1/2011 | Tannenbaum | 705/16 |
| 7,933,799 B2 * | 4/2011 | Aaltonen et al. | 705/14.1 |
| 8,014,756 B1 * | 9/2011 | Henderson | 455/411 |
| 8,423,462 B1 * | 4/2013 | Amacker et al. | 705/41 |
| 2002/0013711 A1 * | 1/2002 | Ahuja et al. | 705/1 |
| 2004/0019564 A1 * | 1/2004 | Goldthwaite et al. | 705/44 |
| 2005/0109838 A1 * | 5/2005 | Linlor | 235/380 |
| 2007/0011099 A1 * | 1/2007 | Sheehan | 705/65 |
| 2007/0022019 A1 | 1/2007 | Sherwin et al. | |
| 2007/0078760 A1 * | 4/2007 | Conaty et al. | 705/39 |
| 2007/0174448 A1 * | 7/2007 | Ahuja et al. | 709/224 |
| 2007/0192248 A1 * | 8/2007 | West | 705/42 |
| 2007/0228148 A1 * | 10/2007 | Rable | 235/379 |

(Continued)

FOREIGN PATENT DOCUMENTS

| | | |
|---|---|---|
| GB | 2425621 A | 11/2006 |
| JP | 2001-338247 A | 12/2001 |

(Continued)

OTHER PUBLICATIONS

RBC Royal Bank "RBC Mobex Mobile Payment Service Agreement" [Online: https://www.rbcroyalbank.com/onlinebanking/bankingusertips/mobilepayments/legal/agreement.html].

(Continued)

*Primary Examiner* — Gregory Johnson
(74) *Attorney, Agent, or Firm* — Maschoff Brennan

(57) ABSTRACT

A method and system for processing payment transaction at a computing device is provided. The method includes receiving a payment request at the computing device from a purchaser terminal, the payment request including purchaser information, determining whether payment information associated with the purchaser information exists at the computing device, and processing payment transaction using the payment information if it is determined that the payment information associated with the purchaser information exists at the computing device.

20 Claims, 4 Drawing Sheets

(56) References Cited

U.S. PATENT DOCUMENTS

| | | | |
|---|---|---|---|
| 2008/0021761 A1* | 1/2008 | Rable | 705/10 |
| 2008/0127300 A1 | 5/2008 | Kim et al. | |
| 2008/0294556 A1* | 11/2008 | Anderson | 705/44 |
| 2009/0119757 A1* | 5/2009 | Acuna et al. | 726/5 |
| 2009/0144193 A1* | 6/2009 | Giordano et al. | 705/39 |
| 2009/0234766 A1* | 9/2009 | Tannenbaum | 705/35 |
| 2010/0114775 A1* | 5/2010 | Griffin | 705/44 |
| 2010/0299249 A1* | 11/2010 | Carlson et al. | 705/39 |
| 2010/0312700 A1* | 12/2010 | Coulter et al. | 705/42 |
| 2011/0004550 A1* | 1/2011 | Giordano et al. | 705/40 |
| 2011/0082790 A1* | 4/2011 | Baker et al. | 705/41 |
| 2011/0093351 A1* | 4/2011 | Afana | 705/16 |
| 2011/0173053 A1* | 7/2011 | Aaltonen et al. | 705/14.1 |
| 2011/0184855 A1* | 7/2011 | Webber et al. | 705/39 |
| 2011/0238476 A1* | 9/2011 | Carr et al. | 705/14.25 |
| 2011/0238517 A1* | 9/2011 | Ramalingam et al. | 705/26.1 |
| 2011/0238569 A1* | 9/2011 | Kim et al. | 705/40 |
| 2012/0078737 A1* | 3/2012 | Kulakowski | 705/16 |
| 2013/0144789 A1* | 6/2013 | Aaltonen et al. | 705/44 |

FOREIGN PATENT DOCUMENTS

| | | |
|---|---|---|
| JP | 2002-189971 A | 7/2002 |
| JP | 2003-337916 A | 11/2003 |
| JP | 2004-258739 A | 9/2004 |
| JP | 2006-293500 A | 10/2006 |
| JP | 2008-269062 A | 11/2008 |
| KR | 10-2006-0096821 A | 9/2006 |
| KR | 20070002191 A | 1/2007 |
| KR | 10-2007-0034296 A | 3/2007 |
| WO | 2007/113921 A1 | 10/2007 |

OTHER PUBLICATIONS

Andrés Guadamuz "Mobile payment systems—A research project" SCRIPT-ed—a Journal of Law, Technology & Society, vol. 1, Issue 2, Jun. 2004 [Online: http://www.law.ed.ac.uk/ahrc/script-ed/issue2/mobile.asp] DOI: 10:2966/scrip.010204.227.

Creditor Web "Credit Card Options for Minors" [Online: http://www.creditorweb.com/articles/credit-card-options-for-minors.html ].

International Search Report dated Feb. 18, 2011 as received in related application No. PCT/KR2010/008498.

"Mobile Payment," from Wikipedia, accessed at http://en.wikipedia.org/wiki/Mobile_payment, Last modified on Apr. 22, 2012, pp. 8.

Supplementary European Search Report mailed Aug. 16, 2013 in European Patent Application No. 10848541.8.

* cited by examiner

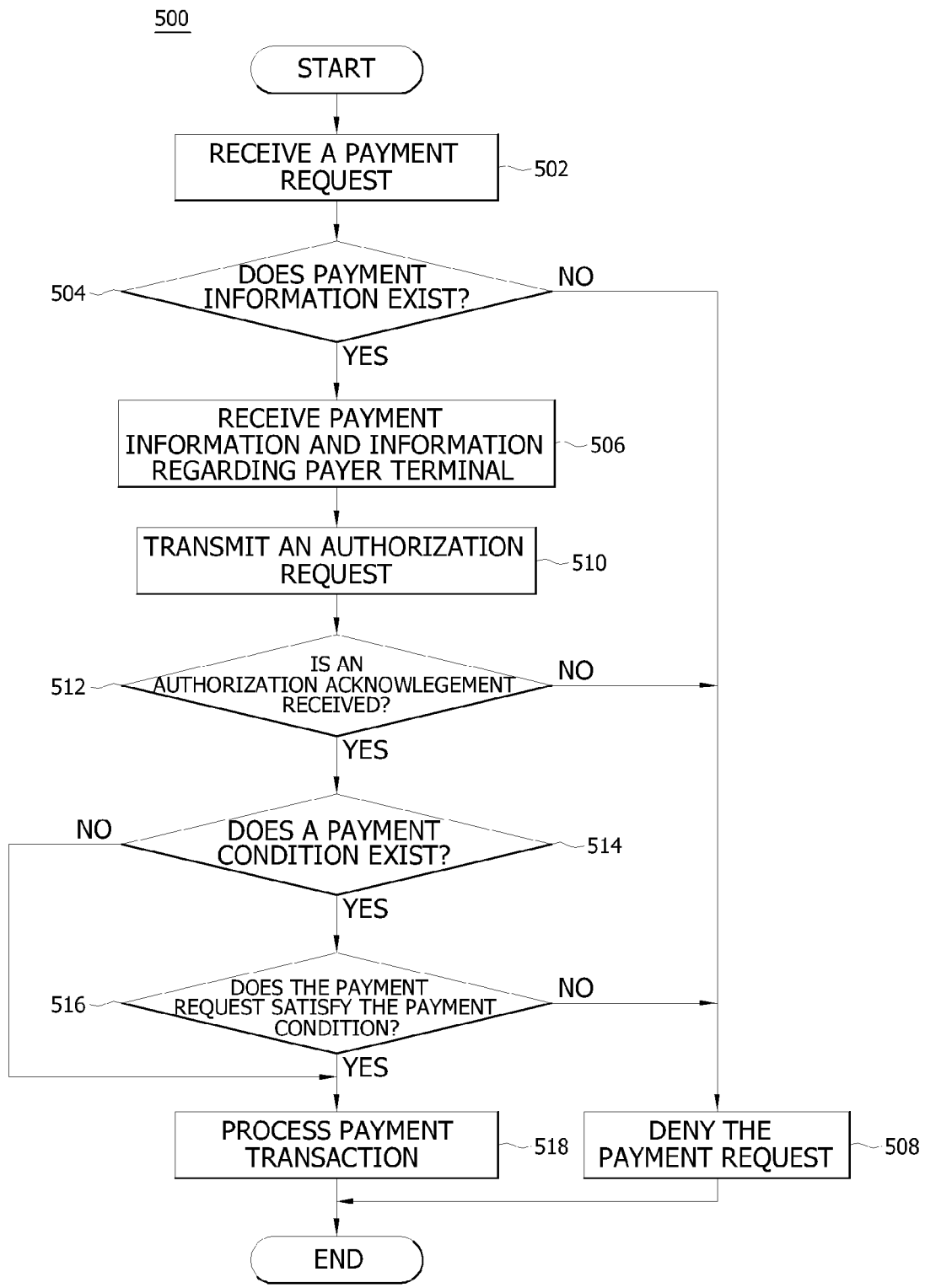

MOBILE PAYMENTS

BACKGROUND

Consumer transactions with merchants are generally made by cash, checks or credit cards. More recently, with the proliferation of mobile devices such as a cellular telephone, a Personal Digital Assistant (PDA), etc that have wireless communications functionality, consumer transactions using the mobile devices have been increased. However, such consumer transactions generally require using a credit card, a certain mobile payment service, etc. Therefore, there is an interest for a payment service that can be provided regardless of using a credit card or passing through a certain mobile payment service.

SUMMARY

According to an illustrative embodiment, a method for processing payment service includes receiving a payment request at the computing device from a purchaser, the payment request including purchaser information, determining whether payment information associated with the purchaser information exists at the computing device, and processing at the computing device the payment transaction using the payment information if it is determined that the payment information associated with the purchaser information exists at the computing device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 is a flow chart of another illustrative embodiment of a method for providing payment service.

DETAILED DESCRIPTION

Figure 1:
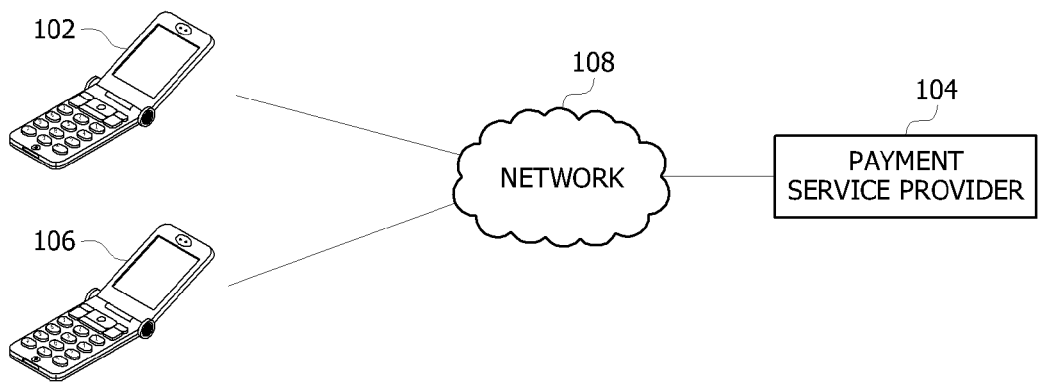
FIG. 1 shows an illustrative embodiment of an overall architecture of a payment service network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

According to one embodiment, a purchaser can make a payment with payer's information through a payment service provider in communications with the purchaser and a payer through a network. Any party who gives an authorization to a third party to make a payment with its payment methods may be the payer, and any party who makes a payment with a third party's payment methods may be the purchaser. For example, the purchaser may be a minor who does not have a payment means such as a credit card, and the payer may be the minor's parent who pays for the minor. For another example, the purchaser may be an employee and the payer may be its employer who allows the employee to make a purchase with the employer's credit card or account information. The payment service provider may communicate with the purchaser and the payer through a network, and enable the purchaser to make a payment using the payer's payment information, e.g., the payer's credit card information, etc. By way of examples, the network may be, without limitation, a mobile phone network or wireless/wireline internet.

In one embodiment where a minor attempts to make a payment by using his or her parents' credit card, the minor may send to a payment service provider a payment request including his/her mobile phone number through a mobile phone network. When the payment request is received, the payment service provider may search a database and finds payment information which is matched with the minor's mobile phone number, and makes the payment using the matched payment information. In another embodiment, the payment service provider may notify the parent of the minor's payment request using the parent's payment information and the payment service provider may make the payment when an approval of the payment request is received from the parent.

FIG. 1 shows an illustrative embodiment of an overall architecture of a payment service network 100. Payment service network 100 includes a purchaser (e.g., a purchaser terminal 102), a payment service provider 104, a payer (e.g., payer terminal 106) and a network 108. In an illustrative embodiment, purchaser terminal 102, payment service provider 104 and payer terminal 106 are computing devices that provide connectivity and accessibility among them. As used herein, the terms "connected," "coupled," or any variant thereof, means any connection or coupling, either direct or indirect, between two or more elements; the coupling or connection between the elements can be physical, logical, or a combination thereof. Examples of purchaser terminal 102 and payer terminal 106 include, without limitation, mobile or portable communications devices, such as cell phones, smart phones, personal digital assistants (PDAs), etc. Any computing device that provides the network connectivity can be purchaser terminal 102 and payer terminal 106.

Network 108 is a communications link that facilitates the transfer of electronic content between purchaser terminal 102, payment service provider 104, and payer terminal 106. It will be appreciated that the network may include or be composed of one or more other types of networks, such as a local area network, a wide area network, a point-to-point dial-up connection, a cell phone network, and the like.

In one embodiment, purchaser terminal 102 can send a payment request to payment service provider 104. The payment request includes purchaser information. For example, the purchaser information may be a mobile phone number of purchaser terminal 102, or any other identification numbers (e.g., serial number, IMEI (International Mobile Equipment Identity) number, ICCID (Integrated Circuit Card ID), etc.) which are assigned to identify purchaser terminal 102. In some embodiments, the payment request may further include an amount of payment. In other embodiments, purchaser terminal 102 may send a separate message including the amount of payment when, for example, requested by payment service provider 104. The term "message" used herein means a set of computing signals that can be used to exchange information between computing systems, such as between purchaser terminal 102 and payment service provider 104. The specific form of the message and protocols for exchanging messages can vary depending on the type of computing systems constituting purchaser terminal 102, payment service provider 104, and payer terminal 106.

Payment service provider 104 is a system that receives the payment request including the purchaser information from purchaser terminal 102, and determines whether payment information matched or associated with the purchaser information exists in its database. By way of example, the payment information may include credit card information or payment account information of the payer. The credit card information may include a credit card number, expiration date, or any other information which is needed to process the payment transaction. The payment account information may include a bank name, a bank account/routing number, etc. When the payment information matched with the purchaser information exists at the database, payment service provider 104 then processes a payment transaction in response to the payment request using the payment information. For example, payment service provider 104 may transmit the payment information and the amount of payment to be paid to a payment server, and receive a payment complete message from the payment server. Here, the payment server refers a system which may be operated by a credit card company or a bank to process the payment transaction.

In some embodiments, the payment information may further include payer information. By way of examples, the payer information may include a mobile phone number or other identification numbers (e.g., serial number, IMEI (International Mobile Equipment Identity) number, ICCID (Integrated Circuit Card ID), etc.) of payer terminal 106. When the payment information includes the payer information, payment service provider 104 may authorize the payment request using the payer information prior to processing the payment transaction. For example, payment service provider 104 may transmit an authorization request corresponding to the payment request to payer terminal 106 according to the payer information, and then, process the payment transaction in response to an authorization acknowledgement issued from payer terminal 106. The authorization request is a message that notifies payer terminal 106 of purchaser terminal 102's attempt to use payer terminal 106's payment information to make the payment and requests payer terminal 106's approval of the payment request. The authorization request may include the purchaser information and amount of payment so that payer terminal 106 can find out the identification of purchaser terminal 102 and the amount of payment which purchaser terminal 102 has requested. Payer terminal 106 may issue the authorization acknowledgement when payer terminal 106 approves the payment request. The authorization acknowledgement may include character strings (e.g., password, etc.) which are pre-determined between payment service provider 104 and payer terminal 106. The authorization request and the authorization acknowledgement may be, for example, text messages (e.g., SMS messages, etc.) between payment service provider 104 and payer terminal 106. Furthermore, the payment information may further include one or more payment conditions for purchaser terminal 102. By way of example, the payment condition may include, but be not limited to, a single payable amount (i.e., a maximum amount of money per one purchase request), a monthly payable amount (i.e., a maximum cumulative amount of money to be paid in one month), a maximum amount of money to be paid for one purchaser terminal or payment time period, etc.

Payer terminal 106 is a computing device which authorizes the payment request of purchaser terminal 102. For example, payer terminal 106 may be a parent's mobile phone in the case that purchaser terminal 102 is a minor's mobile phone. By way of example, when an authorization request is received from payment service provider 104, payer terminal 106 may issue an authorization acknowledgement to payment service provider 104 in response to the authorization acknowledgement.

Figure 2:
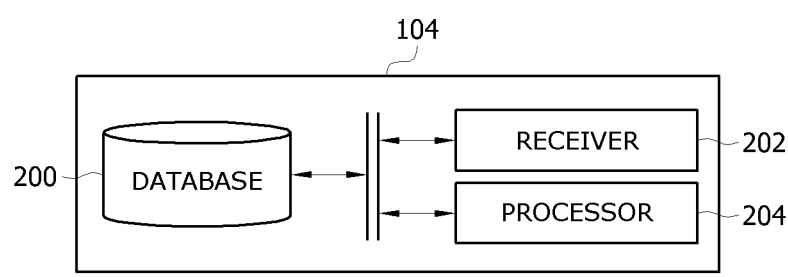
FIG. 2 shows an illustrative embodiment of a payment service provider.

FIG. 2 shows an illustrative embodiment of the payment service provider shown in FIG. 1. As shown, payment service provider 104 includes a database 200, a receiver 202, and a processor 204, where each component is coupled to at least one other component.

Database 200 is configured to receive from purchaser terminal 102 and payer terminal 106 and/or to store purchaser information (e.g., a mobile phone number of purchaser terminal 102), and payment information (e.g., credit card information or bank account information of payer terminal 106) associated with the purchaser information. The term "associated" used herein means that the purchaser information and the payment information are related each other at database 200. For example, the purchaser information and the payment information may be stored in the same record or tuple of a table at database 200 or the purchaser information and the payment information are stored in separate tables but may be connected with the same reference key. Therefore, when receiver 202 receives a payment request (which includes purchaser information) from purchaser terminal 102, processor 204 can search database 200 and find payment information which is associated or related with the received purchaser information.

Receiver 202 is configured to receive a payment request from purchaser terminal 102. As discussed above, the payment request includes purchaser information.

Processor 204 is configured to search database 200 in response to the payment request of purchaser terminal 102, and to determine whether the payment information associated with the received purchaser information exists at database 200. Particularly, processor 204 searches the payment information stored in database 200 to determine whether the received purchaser information is associated with any of the stored payment information. Processor 204 is further configured to process the payment transaction when it determines that such payment information exists in database 200. Alternatively, processor 204 is configured to deny the payment request when it determines that the payment information associated with the received purchaser information does not exist at database 200.

When processor 204 determines that the payment information associated with the received purchaser information exists at database 200, processor 204 then processes a payment transaction using the stored payment information. In one embodiment, processor 204 may be coupled to a payment server (not shown) which is operated by a credit card company or a bank. In this case, processor 204 may transmit the payment information and the amount of payment to be paid to the payment server to process the payment transaction and receive a payment complete message from the payment server. The amount of payment may be included in the received payment request. In another embodiment, receiver 202 may receive from purchaser terminal 102 a separate message that indicates the amount of payment before processor 204 processes the payment transaction. In an alternative embodiment, payment service provider 104 may include a payment module (not shown) that can process the payment transaction.

When processor 204 determines that the payment information associated with the received purchaser information does not exist at database 200, processor 204 denies the payment request. When processor 204 denies the payment request, processor 204 further notifies purchaser terminal 102 of the denial. For example, processor 204 may generate a denial message and sends it to the purchaser terminal 102. The denial message may be an SMS message, voice message, etc.

When the payment information includes payment condition, processor 204 may further determine whether the payment request satisfies the payment condition prior to processing the payment transaction. For example, when the payment information includes a single payable amount of US dollar 1,000, processor 204 may determine whether the amount of the payment contained in the payment request or in a separate message exceeds the single payable amount. Processor 206 may process the payment transaction when the payment request satisfies the payment condition. When the payment request does not satisfy the payment condition, for example, when the requested payment amount is greater than US dollar 1,000, the payment request may be denied, and, then, payment service provider 104 may send a denial message to purchaser terminal 102.

Figure 3:
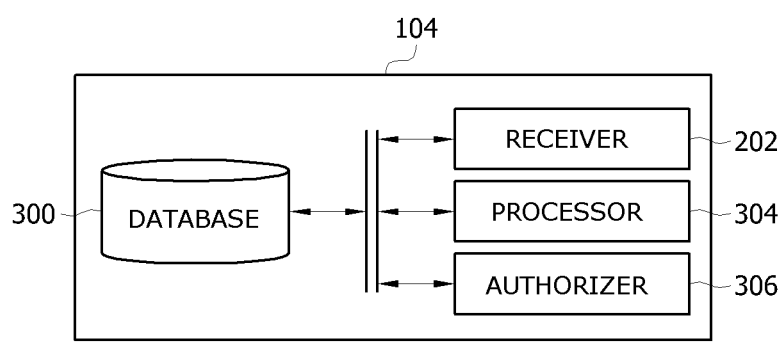
FIG. 3 shows another illustrative embodiment of a payment service provider.

FIG. 3 shows another illustrative embodiment of the payment service provider shown in FIG. 1. As shown, payment service provider 104 includes a database 300, a receiver 202, a processor 304, and an authorizer 306, where each component is coupled to at least one other component. The same elements as those shown in FIG. 2 are denoted by the same reference numerals.

Database 300 is configured to store purchaser information and payment information associated with the purchaser information received from purchaser terminal 102. In one embodiment, the payment information includes payer information, as well as the credit card information or payment account information of payer terminal 106, which is associated with the purchaser information. The payer information may be used for authorization of the payment as described below.

Receiver 202 is configured to receive a payment request from purchaser terminal 102. The payment request includes purchaser information.

Processor 304 is configured to search database 300 in response to the payment request of purchaser terminal 102, and to determine whether payment information associated with the purchaser information exists at database 300. Processor 304 is further configured to process a payment transaction when the payment information associated with the purchaser information exists at database 300 and when the payment is authorized by payer terminal 106.

Authorizer 306 is configured to authorize the payment request using the payer information included in the payment information. Authorizer 306 generates an authorization request based on the payment request and transmits the authorization request to payer terminal 106 using the payer information (e.g., a mobile phone number of payer terminal 106). By way of example, the authorization request may be a text message (e.g., an SMS message) which notifies payer terminal 106 that the payment request has been received from purchaser terminal 102 and requests payer terminal 106's approval of the payment transaction corresponding to the payment request. For example, authorizer 306 may send to payer terminal 106 the text message that requests for a reply message. The reply message may include character strings (e.g., password, etc.) which is pre-determined between payer terminal 106 and payment service provider 104 to approve the payment request. In response to the authorization request, payer terminal 106 may then generate an authorization acknowledgement and transmit the authorization acknowledgement to authorizer 306. In the above example, the authorization acknowledgement may also be an SMS message including the pre-determined character strings. Or payer terminal 106 may reply a denial message or merely not reply at all when payer terminal 106 does not approve the payment request. If the authorization acknowledgement is not received or the authorization acknowledgement does not include the predefined character string or the denial message is received, authorizer 306 determines that the payment request has been denied by payer terminal 106.

Processor 304 processes a payment transaction using the payment information in response to the payment request, but after authorization of the payment request. Particularly, processor 304 processes the payment transaction when authorizer 306 authorizes the payment request, that is, authorizer 306 receives the authorization acknowledgement from payer terminal 106. If the payment request is not authorized by payer terminal 106, processor 304 may deny the payment.

Figure 4:
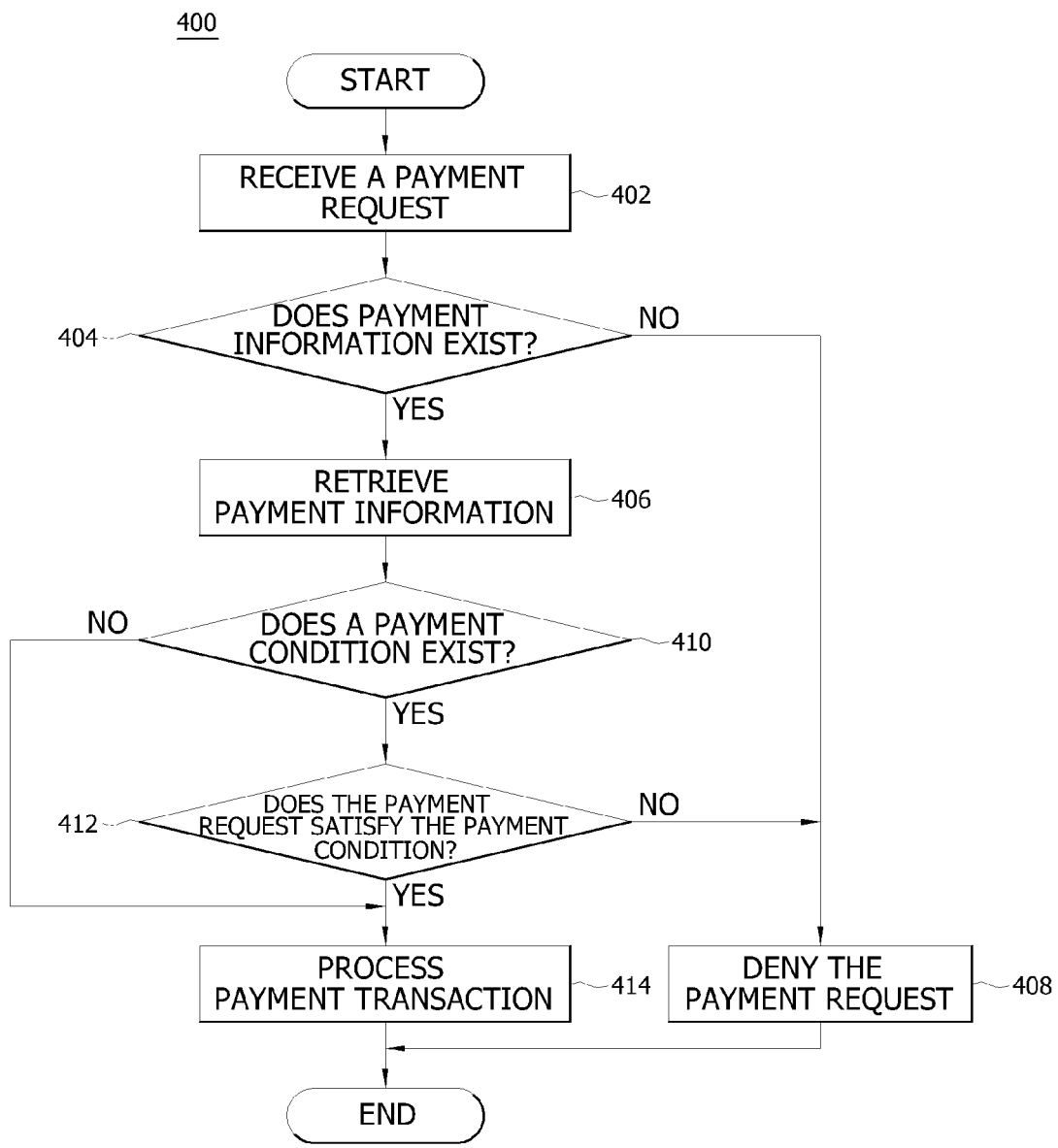
FIG. 4 is a flow chart of an illustrative embodiment of a method for providing payment service.

FIG. 4 is a flow chart of an illustrative embodiment of a method for processing payment service 400. In alternative embodiments, fewer, additional, and/or different operations may be performed. In an illustrative embodiment, method for processing payment service 400 can be performed by payment service provider 104 described with reference to FIG. 2 or 3.

In block 402, receiver 202 of payment service provider 104 receives a payment request from purchaser terminal 102. The payment request includes purchaser information such as a mobile phone number of purchaser terminal 102, or any other identification numbers. In block 404, processor 204 of payment service provider 104 searches database 200 in response to the payment request and determines whether payment information associated with the purchaser information exists at database 200 and, in block 406, processor 204 retrieves the payment information from database 200 if the payment information exists at database 200. If the payment information does not exist at database 200, in block 408, processor 204 denies the payment request. For example, processor 204 may send purchaser terminal 102 a denial message.

In block 410, processor 204 determines whether a payment condition for purchaser terminal 102 exists. By way of example, the payment condition may include, but be not limited to, a single payable amount (i.e., a maximum amount of money per one purchase request), a monthly payable amount (i.e., a maximum cumulative amount of money to be paid in one month), a maximum amount of money to be paid for one purchaser terminal or payment time period, etc. In block 412, when the payment condition for the purchaser terminal exists, processor 204 determines whether the payment request satisfies the payment condition. In block 414, when payment condition does not exist in block 410 or the payment request satisfies the payment condition in block 412, processor 204 processes the payment transaction using the payment information in response to the payment request. In one embodiment, processor 204 may transmit the payment information and the amount of payment to be paid to a payment server (not shown) to process the payment transaction and receive a payment complete message from the payment server. In an alternative embodiment, payment service provider 104 may include a payment module (not shown) that can process the payment transaction. Or, when the payment request does not satisfy the payment condition in block 412, processor 204 denies the payment request in block 408. When processor 204 denies the payment request, processor 204 may further notify purchaser terminal 102 of the denial. For example, processor 204 may generate a denial message and send it to the purchaser terminal 102. The denial message may be an SMS message, voice message, etc.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 5 is a flow chart of another illustrative embodiment of a method for providing payment service 500. In block 502, receiver 202 of payment service provider 104 receives a payment request from purchaser terminal 102. The payment request includes purchaser information such as a mobile phone number of purchaser terminal 102, or any other identification numbers. In block 504, processor 304 of payment service provider 104 searches database 300 in response to the payment request and determines whether payment information associated with purchaser information exists at database 300 and, in block 506, retrieves the payment information from database 300 when the payment information associated with the purchaser information exists. If the payment information does not exist in database 300, in block 508, processor 304 denies the payment request. For example, processor 304 may send purchaser terminal 102 a denial message.

In block 510, authorizer 306 of payment service provider 104 transmits an authorization request corresponding to the payment request to payer terminal 106 using payer information which is included in the payment information. By way of example, the authorization request may be a text message (e.g., an SMS message) which notifies payer terminal 106 that the payment request has been received from purchaser terminal 102 and requests payer terminal 106's approval of the payment transaction corresponding to the payment request. In block 512, authorizer 306 determines whether an authorization acknowledgement issued from payer terminal 106 is received. In the above example, the authorization acknowledgement may also be an SMS message including the predetermined character strings. In block 514, when the authorization acknowledgement is received, processor 304 determines whether a payment condition for purchaser terminal 102 exists. By way of example, the payment condition may include, but be not limited to, a single payable amount (i.e., a maximum amount of money per one purchase request), a monthly payable amount (i.e., a maximum cumulative amount of money to be paid in one month), a maximum amount of money to be paid for one purchaser terminal or payment time period, etc.

In block 516, when the payment condition for purchaser terminal 102 exists at database 300, processor 304 determines whether the payment request satisfies the payment condition. In block 518, when the payment condition does not exist in block 514 or the payment request satisfies the payment condition in block 516, processor 304 processes the payment transaction using the payment information in response to the payment request. In one embodiment, processor 304 may transmit the payment information and the amount of payment to be paid to a payment server (not shown) to process the payment transaction and receive a payment complete message from the payment server. In an alternative embodiment, payment service provider 104 may include a payment module (not shown) that can process the payment transaction. Or, when the authorization acknowledgement is not received in block 512 or the payment request does not satisfy the payment condition in block 516, processor 304 denies the payment request in block 508. When processor 304 denies the payment request, processor 304 may further notify purchaser terminal 102 of the denial. For example, processor 304 may generate a denial message and send it to the purchaser terminal 102. The denial message may be an SMS message, voice message, etc.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to process a payment transaction at a computing device, the method comprising:
associating a first mobile phone number of a purchaser with a second, different mobile phone number of a payer;
receiving a payment request at the computing device directly via a network from the purchaser authorized to make a payment using a bank account or credit card issued to the payer by an issuer, the payment request comprising the first mobile phone number of the purchaser;
determining whether the second, different mobile phone number of the payer associated with the first mobile phone number of the purchaser exists in a database at the computing device, the second, different mobile phone number further associated with payment information comprising information enabling access to the bank account or credit card issued to the payer by the issuer;
after determining the second, different mobile phone number associated with the first mobile phone number exists in the database at the computing device, generating a message comprising notification of the payment request and a request for authorization for the payment using the bank account or credit card issued to the payer;
transmitting the message to a mobile phone of the payer using the second, different mobile phone number of the payer; and
processing at the computing device the payment transaction using the payment information after receiving authorization for the payment request from the second, different mobile phone number of the payer.

2. The method of claim 1, wherein processing the payment transaction further comprises denying the payment request if it is determined that the second, different mobile phone number of the payer does not exist at the computing device.

3. The method of claim 1, further comprising authorizing the payment request using the second, different mobile phone number prior to processing the payment transaction if it is determined that the second, different mobile phone number exists at the computing device.

4. The method of claim 1, wherein transmitting the message to the mobile phone of the payer further comprises identifying information for the purchaser and an amount of money requested in the payment request.

5. The method of claim 1, wherein processing the payment transaction further comprises:
determining whether the payment request satisfies at least one payment condition related to an amount of money per payment request or time period; and
executing the payment transaction using the payment information when the payment request satisfies the at least one payment condition.

6. The method of claim 5, wherein processing the payment transaction further comprises denying the payment request when the payment request does not satisfy the at least one payment condition.

7. The method of claim 5, wherein the at least one payment condition comprises at least one of a single payable amount, monthly payable amount, and payment time period.

8. The method of claim 1, wherein the payment request is wirelessly received at the computing device from a mobile phone of the purchaser.

9. The method of claim 1, wherein the purchaser comprises a minor and the payer comprises a parent of the minor.

10. The method of claim 1, wherein receiving the payment request at the computing device directly via the network from the purchaser authorized to make the payment using the bank account or credit card issued to the payer by the issuer comprises receiving the payment request at the computing device operated by a credit card company that issues the credit card to the payer.

11. The method of claim 1, wherein determining whether payment information associated with the purchaser's mobile phone number exists at the computing device comprises identifying a credit card number corresponding to the first mobile phone number, wherein the payment request is received from the purchaser's mobile phone associated with the first mobile phone number.

12. A system, comprising:
a receiver configured to receive a payment request directly via a network from a purchaser authorized to make a payment using a bank account or credit card issued to a payer by an issuer, the payment request comprising a first mobile phone number for the purchaser;
a database configured to receive and store payment information associated with the first mobile phone number for the purchaser, the payment information comprising a second, different mobile phone number for the payer and information for accessing the bank account or the credit card issued to the payer by the issuer; and
a processor configured to:
generate, after determining the second, different mobile phone number associated with the first mobile phone number exists in the database, a message comprising notification of the payment request and a request for authorization for the payment using the bank account or credit card issued to the payer;
transmit the request for authorization to a mobile phone associated with the payer using the second, different mobile phone number; and
process a payment transaction in response to the payment request after receiving authorization for the payment from the mobile phone of the payer.

13. The system of claim 12, wherein the processor is further configured to deny the payment request if it is determined that the second, different mobile phone number associated with the first phone number does not exist at the database.

14. The system of claim 12, wherein the payment information comprises a credit card number for the credit card issued to the payer by the issuer.

15. The system of claim 12, wherein the purchaser comprises a minor and the payer comprises a parent of the minor.

16. The system of claim 12, wherein the processor is further configured to determine whether the payment request satisfies at least one payment condition related to an amount of money per payment request or time period and to execute the payment transaction using the payment information when the payment request satisfies the payment condition.

17. The system of claim 16, wherein the processor is configured to deny the payment request when the payment request does not satisfy the at least one payment condition.

18. The system of claim 16, wherein the at least one payment condition comprises at least one of a single payable amount, monthly payable amount, and payment time period.

19. The system of claim 12, wherein the first mobile phone number of the purchaser is stored with the second, different mobile phone number of the payer on the database.

20. A method, comprising:

associating a first mobile phone number of a purchaser with a second mobile phone number of a payer through linkage of the first mobile phone number and the second mobile phone number in a same record or tuple of a table in a database at a computing device or through linkage of the first mobile phone number and the second mobile phone number, located in separate tables in the database, using a same reference key, the first mobile phone number being different than the second mobile phone number;

receiving a payment request at the computing device directly via a network from the purchaser authorized to make a payment using a bank account or credit card issued to the payer by an issuer, the payment request comprising the first mobile phone number of the purchaser;

determining whether the second mobile phone number of the payer associated with the first mobile phone number of the purchaser exists in the database at the computing device, the second mobile phone number further associated with payment information comprising information enabling access to the bank account or credit card issued to the payer by the issuer;

when it is determined that the second mobile phone number associated with the first mobile phone number does not exist in the database at the computing device, the method includes denying the payment request;

when it is determined that the second mobile phone number associated with the first mobile phone number exists in the database at the computing device, the method includes:

generating a message comprising notification of the payment request and a request for authorization for the payment using the bank account or credit card issued to the payer;

transmitting the message to a mobile phone of the payer using the second mobile phone number of the payer; and processing, at the computing device, the payment request using the payment information after receiving authorization for the payment request from the second mobile phone number of the payer.

\* \* \* \* \*